United States Patent
Harris et al.

(10) Patent No.: US 11,958,338 B2
(45) Date of Patent: Apr. 16, 2024

(54) VEHICLE VENT ASSEMBLY

(71) Applicant: Dyson Technology Limited, Wiltshire (GB)

(72) Inventors: Roy Alan Harris, Swindon (GB); Adam Pinkstone, Gloucester (GB); Tomasz Edward Pendleton, Swindon (GB); Roy Edward Poulton, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 297 days.

(21) Appl. No.: 17/601,024

(22) PCT Filed: Feb. 3, 2020

(86) PCT No.: PCT/GB2020/050239
§ 371 (c)(1),
(2) Date: Oct. 1, 2021

(87) PCT Pub. No.: WO2020/201673
PCT Pub. Date: Oct. 8, 2020

(65) Prior Publication Data
US 2022/0169094 A1     Jun. 2, 2022

(30) Foreign Application Priority Data
Apr. 5, 2019 (GB) .................................... 1904838

(51) Int. Cl.
*B60H 1/34* (2006.01)
*B60H 1/24* (2006.01)
*B62D 1/16* (2006.01)

(52) U.S. Cl.
CPC ........... *B60H 1/3414* (2013.01); *B60H 1/246* (2013.01); *B62D 1/16* (2013.01)

(58) Field of Classification Search
CPC .. B60H 1/3414; B60H 1/246; B60H 1/00292; B60H 1/242; B60D 1/16
See application file for complete search history.

(56) References Cited

U.S. PATENT DOCUMENTS

| 3,752,401 A | 8/1973 | Kizilos |
| 3,888,506 A | 6/1975 | Haas |

(Continued)

FOREIGN PATENT DOCUMENTS

| CA | 2704391 A1 | 6/2009 |
| CN | 102563830 A | 7/2012 |

(Continued)

OTHER PUBLICATIONS

GB Search Report received for GB Application No. 1904839, dated Sep. 18, 2019, 1 page.

(Continued)

*Primary Examiner* — Jessica Yuen
(74) *Attorney, Agent, or Firm* — Tucker Ellis LLP; Michael G. Craig

(57) ABSTRACT

A vehicle is disclosed. The vehicle includes a passenger cabin; a steering assembly including a steering wheel mounted on a steering column assembly; and a ventilation system having a first air outlet for discharging a first jet of air, and a second air outlet for discharging a second jet of air. The first air outlet and the second air outlet are located on the steering column and the second jet of air intersects and deflects the first jet of air.

13 Claims, 9 Drawing Sheets

(56) References Cited

U.S. PATENT DOCUMENTS

| | | | |
|---|---|---|---|
| 4,562,957 A * | 1/1986 | Nakagawa | B60H 1/2225 219/202 |
| 4,585,177 A | 4/1986 | Sugawara et al. | |
| 4,783,115 A | 11/1988 | Galubensky et al. | |
| 7,614,682 B1 | 11/2009 | Major et al. | |
| 8,141,622 B2 | 3/2012 | Kang et al. | |
| 10,844,966 B2 | 11/2020 | Clement et al. | |
| 2006/0121843 A1* | 6/2006 | Koval | B60H 1/242 454/152 |
| 2008/0014855 A1 | 1/2008 | Leserre | |
| 2009/0038774 A1 | 2/2009 | Ogiso et al. | |
| 2010/0267295 A1 | 10/2010 | Krautkraemer | |
| 2013/0180354 A1 | 7/2013 | Maranville et al. | |
| 2014/0370797 A1 | 12/2014 | Beau et al. | |
| 2015/0126104 A1 | 5/2015 | Ooes | |
| 2015/0197135 A1 | 7/2015 | Chen et al. | |
| 2015/0233328 A1 | 8/2015 | Ghorpade et al. | |
| 2016/0101668 A1 | 4/2016 | Doll et al. | |
| 2016/0121697 A1 | 5/2016 | Yamamoto et al. | |
| 2016/0167481 A1 | 6/2016 | Makihara et al. | |
| 2016/0368519 A1 | 12/2016 | Stefan | |
| 2017/0028818 A1 | 2/2017 | Tille et al. | |
| 2017/0144689 A1 | 5/2017 | Peng et al. | |
| 2017/0174246 A1* | 6/2017 | Kossakovsk | B60H 1/00478 |
| 2017/0326938 A1 | 11/2017 | Motomura | |
| 2018/0043752 A1 | 2/2018 | Motomura et al. | |
| 2018/0065601 A1 | 3/2018 | Hagan et al. | |
| 2018/0079278 A1 | 3/2018 | Kirpichnikov et al. | |
| 2018/0126819 A1 | 5/2018 | Bast | |
| 2018/0236844 A1 | 8/2018 | Zemsch et al. | |
| 2019/0009650 A1 | 1/2019 | Yueksel | |
| 2019/0092142 A1 | 3/2019 | Dhake et al. | |
| 2019/0126716 A1 | 5/2019 | Kjille | |
| 2022/0176784 A1 | 6/2022 | Pinkstone et al. | |
| 2022/0194166 A1 | 6/2022 | Harris et al. | |

FOREIGN PATENT DOCUMENTS

| | | |
|---|---|---|
| CN | 203111289 U | 8/2013 |
| CN | 204236183 U | 4/2015 |
| CN | 104847545 A | 8/2015 |
| CN | 105109302 A | 12/2015 |
| CN | 105408155 A | 3/2016 |
| CN | 106163843 A | 11/2016 |
| CN | 106256574 A | 12/2016 |
| CN | 106969482 A | 7/2017 |
| CN | 107000545 A | 8/2017 |
| CN | 107792018 A | 3/2018 |
| CN | 107848362 A | 3/2018 |
| CN | 109195823 A | 1/2019 |
| CN | 109203919 A | 1/2019 |
| CN | 109552005 A | 4/2019 |
| DE | 2430553 | 1/1976 |
| DE | 2458643 A1 | 6/1976 |
| DE | 4317358 | 12/1994 |
| DE | 19854537 | 6/2000 |
| DE | 102004039950 | 3/2005 |
| DE | 102015100312 | 7/2015 |
| DE | 102015109069 | 12/2016 |
| DE | 102017113906 | 8/2017 |
| EP | 0189074 | 9/1988 |
| FR | 1076890 | 11/1954 |
| FR | 2886382 A1 | 12/2006 |
| FR | 2894521 | 6/2007 |
| FR | 2924058 A1 | 5/2009 |
| GB | 2072325 | 9/1981 |
| JP | 50-021849 | 3/1975 |
| JP | 55-170170 | 12/1980 |
| JP | 56-116510 | 9/1981 |
| JP | 56-155910 | 11/1981 |
| JP | 58-020839 | 2/1983 |
| JP | 58-067511 | 4/1983 |
| JP | 58-088206 | 5/1983 |
| JP | 59-057011 | 4/1984 |
| JP | 61-195236 A | 8/1986 |
| JP | 62-225844 | 10/1987 |
| JP | 62-225845 | 10/1987 |
| JP | 03-028071 | 2/1991 |
| JP | 04-123708 | 11/1992 |
| JP | 2004-148965 | 5/2004 |
| JP | 2005-145139 | 6/2005 |
| JP | 2005-153718 | 6/2005 |
| JP | 2006-240512 | 9/2006 |
| JP | 2013-241048 | 12/2013 |
| JP | 2015-020566 | 2/2015 |
| JP | 2015-214215 A | 12/2015 |
| JP | 2017-039381 | 2/2017 |
| KR | 10-2007-0068568 | 7/2007 |
| KR | 10-2017-0037343 A | 4/2017 |
| WO | 2006/125915 A1 | 11/2006 |
| WO | 2009/016717 | 2/2009 |
| WO | 2009/020173 | 11/2010 |
| WO | 2015/149248 A1 | 10/2015 |
| WO | 2019/048264 A1 | 3/2019 |

OTHER PUBLICATIONS

GB Search Report received for GB Application No. 1918885, dated May 11, 2020, 2 pages.

International Search Report and Written Opinion received for PCT Patent Application No. PCT/GB2020/050058, dated May 7, 2020, 10 pages.

International Search Report and Written Opinion received for PCT Patent Application No. PCT/GB2020/050239, dated Apr. 29, 2020, 10 pages.

International Search Report and Written Opinion received for PCT Patent Application No. PCT/GB2020/050240, dated May 6, 2020, 10 pages.

Search Report received for GB Application No. 1904837, dated Sep. 17, 2019, 1 page.

Search Report received for GB Application No. 1904838, dated Sep. 17, 2019, 1 page.

Office Action received for Chinese Patent Application No. 202080023465.2, dated Jul. 24, 2023, 7 pages (Original Document Only).

Office Action received for Chinese Patent Application No. 202080023491.5, dated Jul. 20, 2023, 18 pages (10 pages of English Translation and 8 pages of Original Document).

Office Action received for Chinese Patent Application No. 202080025036.9, dated Jul. 20, 2023, 19 pages (11 pages of English Translation and 8 pages of Original Document).

* cited by examiner

VEHICLE VENT ASSEMBLY

RELATED APPLICATION DATA

This application is the National Stage of International Application No. PCT/GB2020/050239 filed Feb. 3, 2020, and claims benefit of United Kingdom Application No. 1904838.0 filed Apr. 5, 2019, each of which are herein incorporated by reference in their entirety.

FIELD OF THE INVENTION

The present invention relates to a vehicle comprising a vent assembly for discharging air into the cabin of a vehicle.

BACKGROUND OF THE INVENTION

Vehicles such as passenger cars usually include a ventilation system for discharging air into the passenger cabin to improve occupant comfort. Typically such ventilation systems include a plurality of vents at a front of the passenger cabin for directing jets of air rearwardly into the passenger cabin towards cabin seating positions. A difficulty can be encountered however in directing air rearwardly towards the seated driver of the vehicle as the steering wheel can tend to obstruct the path of air.

SUMMARY OF THE INVENTION

According to an aspect of the present invention, there is provided a vehicle comprising: a passenger cabin; a steering assembly comprising a steering wheel mounted on a steering column assembly; and a ventilation system having a first air outlet for discharging a first jet of air, and a second air outlet for discharging a second jet of air, wherein the first air outlet and the second air outlet are located on the steering column assembly and the second jet of air intersects and deflects the first jet of air.

In this arrangement the first jet of air may be targeted at a driver seated rearwardly of the steering wheel to improve ventilation of the driver. The second jet of air may deflect the first jet to alter the direction of the first jet.

Locating the first air outlet and the second air outlet on the steering column brings the outlets closer to a driver of the vehicle. Consequently, the first jet of air is required to travel a shorter distance from the first air outlet to the target driver. The jet may thus be expected to diffuse to a lesser degree with the result that a more concentrated jet of air may be targeted at the driver. Locating the outlets on the steering column has the further advantage that if the steering column is moved, for example, by adjustment of a 'rake' or 'reach' position of the steering column, the outlets are correspondingly moved, and so the risk, for example, of the column being adjusted to a position in which one or both of the jets of air are blocked, or otherwise interfered with, by the steering column is avoided.

The first air outlet and the second air outlet may be located on a lower half of the steering column assembly, i.e. on a half of the steering column on a lower side of the long axis of the steering column. In other words, the outlets may be located closer to a lower surface of the steering column than an upper surface. Consequently, the outlet may be obscured from the eyeline of a driver seated rearwardly of the steering assembly by an upper half of the steering column assembly.

The steering wheel may comprise a hub and a rim and the first jet of air may project below the hub. Consequently, the hub may shield the first jet of air from downward flows of air, such that the first jet of air may be less susceptible to buffeting by ambient airflows within the passenger cabin. As a result the course of the first jet through the cabin may be made more stable and predictable. Further, in this arrangement the hub may act to shield upper regions of the cabin from the first jet, thereby reducing buffeting of the air of the upper regions of the cabin by the first jet, and so improving cabin occupant comfort. Furthermore, in this arrangement, the hub may act to shield the upper regions of the cabin from audible noise emanating from the first jet of air, thereby further improving cabin occupant comfort.

The second air outlet may be located above the first air outlet, and the second jet of air may project downwardly to intersect the first jet of air. Thus, the second jet of air may deflect the first jet of air downwardly. Because the second jet is directed downwardly, any part of the second jet that does not intersect the first jet may be expected to continue on a downward trajectory towards a floor of the passenger cabin. On a downward trajectory the second jet is less likely to cause buffeting in the upper regions of the passenger cabin. Occupants of the passenger cabin may typically be less susceptible to buffeting in the lower regions of the passenger cabin than in the upper regions. As a result in this arrangement the risk of discomfort being caused to the cabin occupants is reduced.

The ventilation system may comprise a valve for regulating the rate of flow of the second jet of air relative to the first jet of air to vary the amount by which the first jet of air is deflected. In other words, the ventilation system may comprise at least one valve for regulating the rate of flow at least one of the first jet of air or the second jet of air to facilitate control of the relative flow rates of the jets. For example, a valve may be provided for regulating the rate of flow of the second jet of air. As an alternative, a valve could be provided for regulating the first jet of air.

In this arrangement the degree to which the first jet is deflected, and so the trajectory of the deflected first jet, may thus be varied to allow targeting of different regions of the driver by the deflected first jet.

The ventilation system may optionally comprise one or more valves for regulating the rate of flow of each of the first jet of air and the second jet of air. By regulating the rate of flow of each of the first and second jets both the trajectory and rate of flow of the deflected first jet of air may be varied independently.

The valve, or the one or more valves, may be located on the steering column. In this arrangement the valve may advantageously be located close to the outlets, which may advantageously result in improved backpressure characteristics, and specifically, a reduction in fluctuation of backpressure upstream of the valve.

Alternatively, the valve(s) could be located at a position remote from the steering column assembly. Although, locating the position remotely from the steering column assembly may increase the distance between the valve and the outlets, and so undesirably increase backpressure fluctuation, packaging of the valve may be relatively easier off the steering column assembly.

The ventilation system may comprise a blower, an upstream duct extending from the blower to the valve, a first downstream duct extending from the valve to the first air outlet, and a second downstream duct extending from the valve to the second air outlet. In other words, the ventilation system may comprise a common valve for regulating the rate of flow of each of the first and second jets of air. A common valve advantageously reduces the complexity of the ventilation system, and in particular simplifies control of the operation of the ventilation system.

The first jet of air may be discharged from the first outlet along a first jet axis, the second jet of air may be discharged from the second outlet along a second jet axis, and the second jet axis may be inclined at an angle of between 80 and 100 degrees relative to the first jet axis. In this arrangement, the second jet of air will be expected to collide with the first jet of air at a relatively steep angle of incidence, which may be expected to advantageously result in relatively efficient deflection of the first jet by the second jet. Optionally the second jet axis may be orthogonal to the first jet axis. This arrangement may be expected to result in the most efficient deflection of the first jet by the second jet.

The steering wheel may comprise a hub and a rim, and the first jet of air may project through a gap between the hub and the rim. In this arrangement the first jet of air may pass through the hub-rim gap of the steering wheel towards a driver seated rearwardly of the steering wheel to improve ventilation of the driver. Because the first jet projects through the gap between the hub and the rim of the steering wheel, the first jet may pass through the hub-rim gap even without deflection by the second jet. Consequently, a relatively high rate of airflow through the hub-rim gap may be achieved with minimal deflection of the first jet.

The second jet of air may intersect the first jet of air at a position upstream of the gap. In other words, the second jet of air may be directed to intersect the first jet of air at a position between the first air outlet and the hub-rim gap of the steering wheel.

The efficiency of the deflection of the first jet by the second jet may be expected to decrease with increasing diffusion of the first jet.

In general, the degree of diffusion of the first jet may be expected to increase as a function of distance from the first outlet. More particularly, a step increase in the diffusion of the first jet of air may be expected to occur as the first jet passes through the gap between the hub and the rim of the steering wheel, for example, due to attachment and deflection of the boundary regions of the jet to the surfaces of the hub and the rim.

Consequently, at a position upstream of the gap, i.e., between the first outlet and the gap, the degree of diffusion of the first jet may be expected to be relatively lower than at a position downstream of the gap, i.e. after the first jet has passed through the hub-rim gap. As a result, a given degree of deflection of the first jet may be obtained by a second jet with a relatively lower flow rate where the jets collide upstream of the gap. A second jet of air with a relatively lower flow rate may advantageously be generated using a lower power blower consuming less electrical energy. Further, a second jet with a lower flow rate may advantageously produce lower audible noise levels as the jet is discharged through the second air outlet and as the jet collides with the first jet.

The first jet of air may have a width or height at the gap that is no greater than 120% of the gap. In other words, the ventilation system may be adapted to shape the first jet of air such that, accounting for diffusion of the jet of air, the first jet has width and/or height dimensions at the distance of the hub-rim gap of the steering wheel that are no greater than 120% of the corresponding dimension of the hub-rim gap. In this arrangement it may be expected that a majority of the air of the first jet will successfully pass through the hub rim gap with minimal blocking or deflection by the hub and/or the rim of the steering wheel. In the alternative, if the first jet were shaped to have significantly larger height or width dimensions at the distance of the steering wheel, it may be expected that a lower proportion of the first jet would successfully pass through the hub-rim gap towards the target, and a greater proportion may be blocked or deflected by the hub or the rim.

The first jet of air may attach to and follow a curved surface of the hub to deflect the first jet of air. In other words, the first jet of air may be directed so as to experience the Coanda effect as it flows alongside the curved surface of the hub, thereby causing the first jet of air to attach to the curved surface and be deflected to follow the curvature of the curved surface. For example, the first jet of air may project alongside a surface of the hub such that the first jet of air encounters the surface of the hub as it flows alongside, and the surface of the hub may curve away from the first jet.

Thus, in this arrangement, the first jet may be further deflected away from its original trajectory by its encounter with the curved surface of the hub. This additional deflection may permit targeting the deflected jet of air at regions of the passenger cabin that could otherwise not be reached by the first jet. As an example, where the first jet of air projects below the hub, by attaching to the curved surface of the hub, the first jet may be deflected upwards, towards upper regions of the cabin, on a trajectory that would otherwise be blocked by the hub.

The second jet of air may deflect the first jet of air in a first direction, and the curved surface of the hub may deflect the first jet of air in a second, different direction. In other words, the second jet of air may be oriented to deflect the first jet in a first direction and the curved surface of the hub may be oriented to deflect the first jet in an alternative direction.

In this arrangement the first jet of air can thus be deflected in two different directions by its encounter with the second jet and the hub. The range of trajectories of the deflected first jet may thus be increased. As a result, the deflected first jet may be targeted at a broader range of cabin locations.

As an example, the first jet of air could be directed to project alongside a surface of the hub, the second air outlet could be located to the same side of the first jet as the surface of the hub, and the second jet of air could project from the second air outlet in a direction away from the surface of the hub to intersect the first jet.

The second jet could be oriented to deflect the first jet downwardly and the hub could be oriented to deflect the first jet upwardly. For example, the first jet of air may project below the hub of the steering wheel and the curved surface of the hub may curve upwardly away from the first jet of air, such that the first jet of air is deflected in an upward direction by its encounter with the hub, and optionally the second jet of air may project from the second air outlet downwardly to intersect the first jet of air, such that the first jet of air is deflected in a downward direction by its encounter with the second jet.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1:
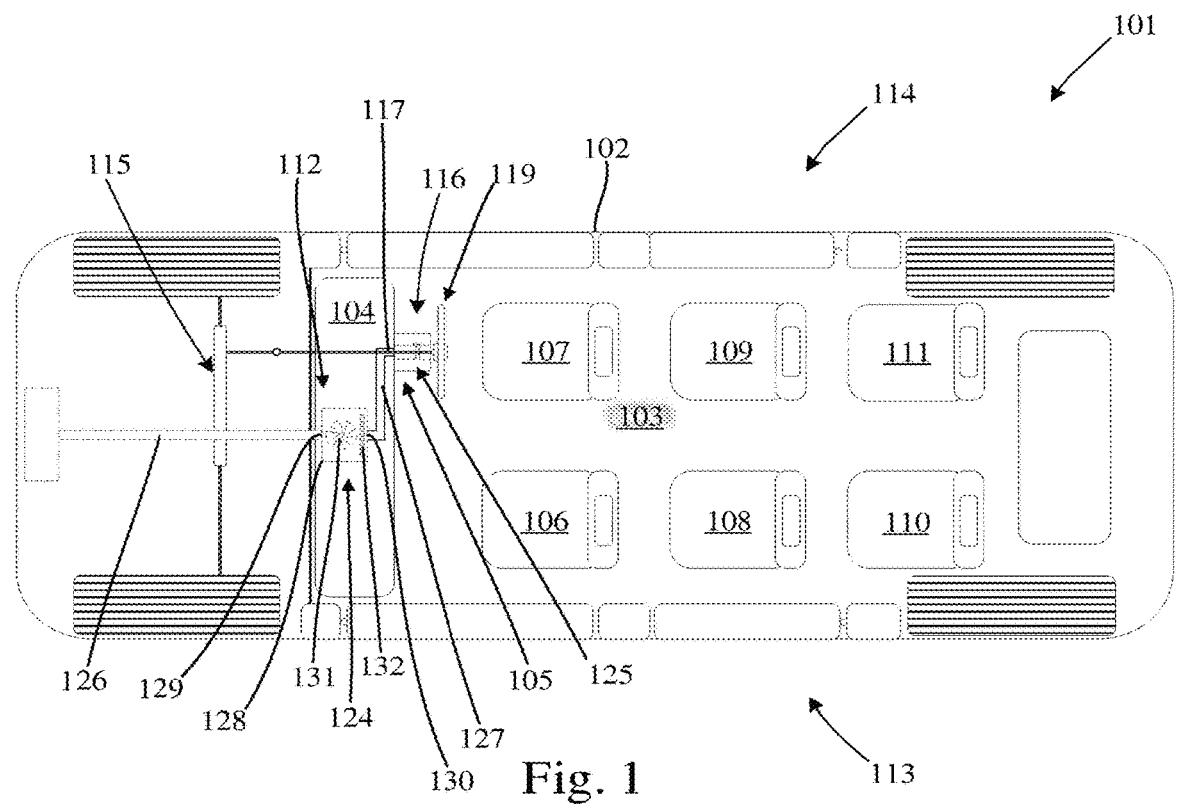
FIG. 1 is a schematic aerial view of a passenger car embodying the present invention, comprising a ventilation system for ventilating a passenger cabin of the car.
Figure 2:
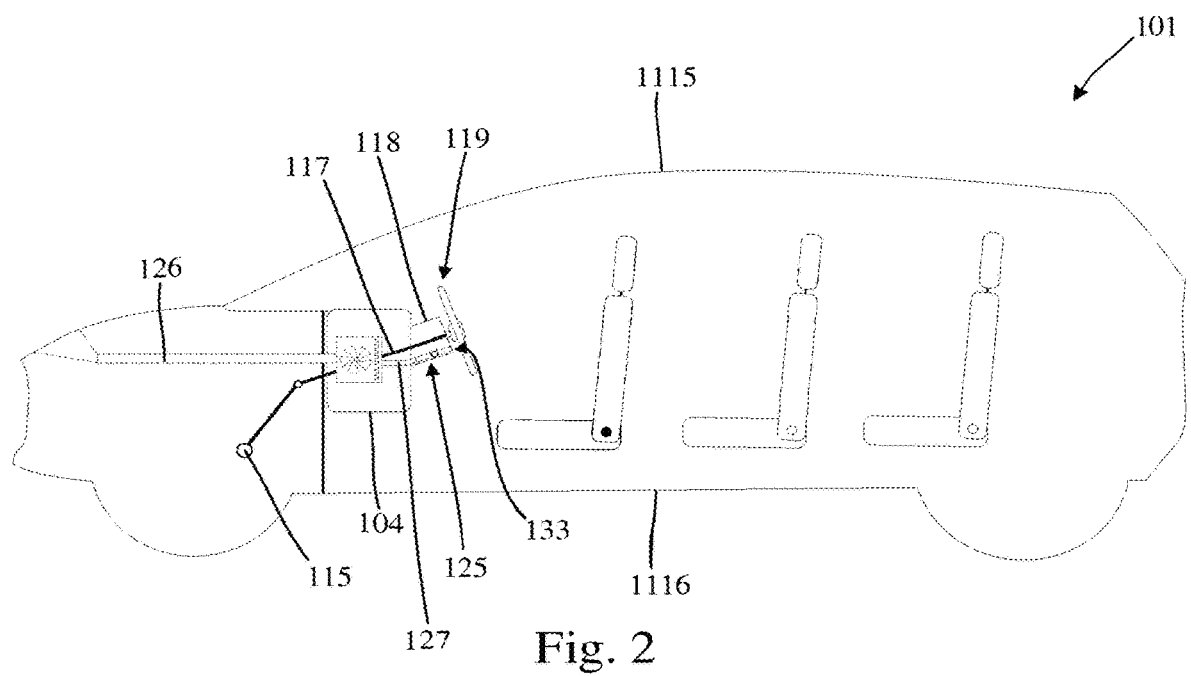
FIG. 2 is a schematic side view of the passenger car.
Figure 3:
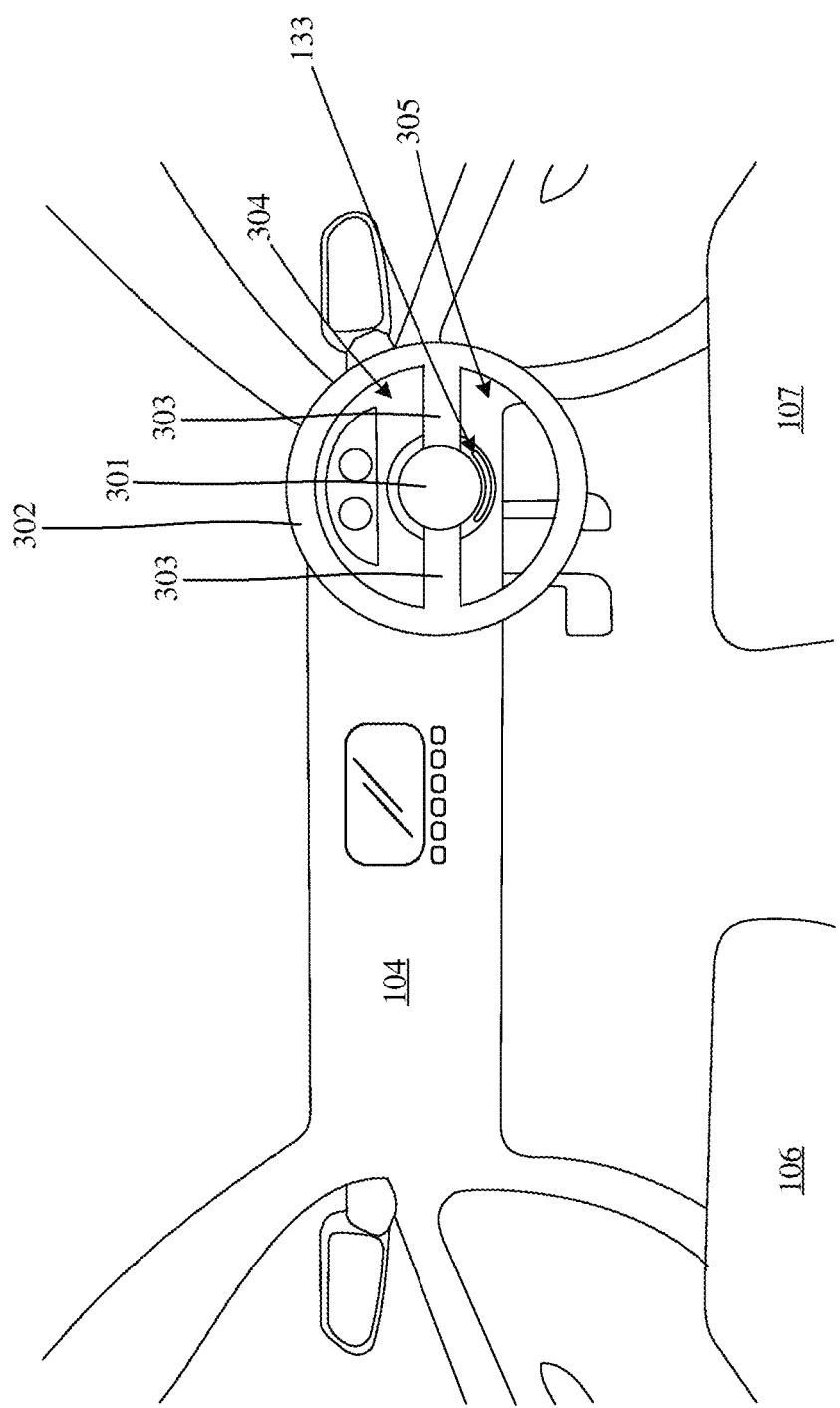
FIG. 3 is an illustrative view of an instrument panel of the passenger car showing a vent assembly of the ventilation system according to a first embodiment of the invention.

A vehicle, in the form of a passenger car 101, according to an exemplary embodiment of the present invention is shown in FIGS. 1, 2, and 3.

Referring to the Figures, vehicle 101 comprises a body structure 102 defining internally a passenger cabin 103 for accommodating passengers, an instrument panel 104 carrying vehicle controls located at a front end of the passenger cabin 103, a steering assembly 105, a plurality of seats 106 to 111 for seating passengers located in a seating region of the passenger cabin, and a ventilation system 112 for ventilating the passenger cabin to improve occupant comfort.

The body structure 103 comprises left and right side structures indicated generally at 113 and 114 respectively, and roof and floor structures 1115, 1116 respectively. The instrument panel 104 is installed at a front end of the passenger cabin 103 forwardly of the seats 106 to 111 and extends transversely, i.e. in the width dimension, of the passenger cabin 103 between the left and right side structures 113, 114.

The steering assembly 105 comprises a steering rack assembly 115, a steering column assembly 116, and a steering wheel assembly 119.

The steering rack assembly 115 is substantially conventional, and comprises a toothed rack that is connected at outer ends to pivot hubs supporting the front wheels of the vehicle. The toothed rack of the steering rack assembly 115 is linearly movable in the transverse direction, i.e. the width-wise of the vehicle, to control the steering of the front wheels of the vehicle.

The steering column assembly 116 comprises a column shaft 117 and a column cowl 118.

The column shaft 117 comprises a rotatable shaft that is coupled at a first end to an input of the steering rack assembly 115, and which extends through the instrument panel 104 to a second end in the passenger cabin 103. The steering column cowl 118 is arranged to extend circumferentially around the portion of the steering column 117 closest to the second end which extends through the instrument panel 104 into the passenger cabin 103, to thereby obscure the steering column 117 from the view of occupants seated in the passenger cabin and prevent entanglement of articles with the column shaft 117. In the example, the steering column cowl 118 is formed of rigid plastic and is rotatably mounted to the columns shaft 117 such that the column shaft 117 may rotate within the cowl 118.

The steering wheel assembly 119 comprises a hub 301, a rim 302, and spokes 303 spanning the gaps 304, 305 between the hub 301 and the rim 302 and rigidly connecting the rim to the hub. The hub 301 of the steering wheel 119 is mounted to the second end of the column shaft 117 such that the steering wheel 119 is rotationally coupled to the shaft 117. A torque applied to the rim 302 of the steering wheel 119 by the driver may thus be transmitted by the shaft 117 to the steering rack assembly 115 to steer the front wheels of the vehicle.

The plurality of seats 106 to 111 are arranged in three transverse rows of two seats. Thus, a first row of seating is formed by seats 106 and 107, a second row of seating by seats 108 and 109, and a third row of seating by seats 110 and 111. Each of the rows of seats comprises a left-hand seat 106, 108, 110 respectively, positioned to a left-side of a longitudinal centreline of the passenger cabin, and a right-hand seat 107, 109, 111 respectively, positioned to a right-side of the longitudinal centreline.

Ventilation system 112 comprises an air-handling unit 124, a vent assembly 125, and duct assemblies 126, 127.

Air-handling unit 124 comprises a housing 128 defining an inlet 129 and an outlet 130. The housing 128 contains an electrically driven fan assembly 131 and a heating element 132. The fan 131 is operable by conventional control circuitry to generate an airflow in through the inlet 129, over the heating element 132 and out through the outlet 130. In the example the heating element 132 is a conventional liquid-air heat exchanger through which a heated liquid is circulated by a remote source. The air-handling unit 124 is installed at a front end of the passenger cabin 103 forwardly of the instrument panel 104.

Vent assembly 125 is mounted to the steering column assembly 116 within the steering column cowl 118. The vent assembly 125 is thus obscured from the view of cabin occupants by the steering column cowl 118. The vent assembly comprises outlet pair 133 which are open into the passenger cabin 103 through the steering column cowl 118, such that the vent assembly 125 can discharge air into the passenger cabin through the outlets 133 generally towards the driver seated in seat 107.

Duct assembly 126 communicates the inlet 129 of the air-handling unit 124 with atmosphere surrounding the vehicle so that the fan 131 may draw air into the air-handling unit from an exterior of the vehicle. Duct assembly 127 is joined to the outlet 130 of the air-handling unit 124 and carries airflow from the air-handling unit 124 to an inlet of the vent assembly 125 such that the vent assembly 125 can receive airflow from the air-handling unit 124 via the duct assembly 127.

The ventilation system 112 is thus operable to draw air in from atmosphere, over the heating element 128, and discharge the air through the vent assembly 125 into the passenger cabin 103 towards the seated driver.

Figure 4:
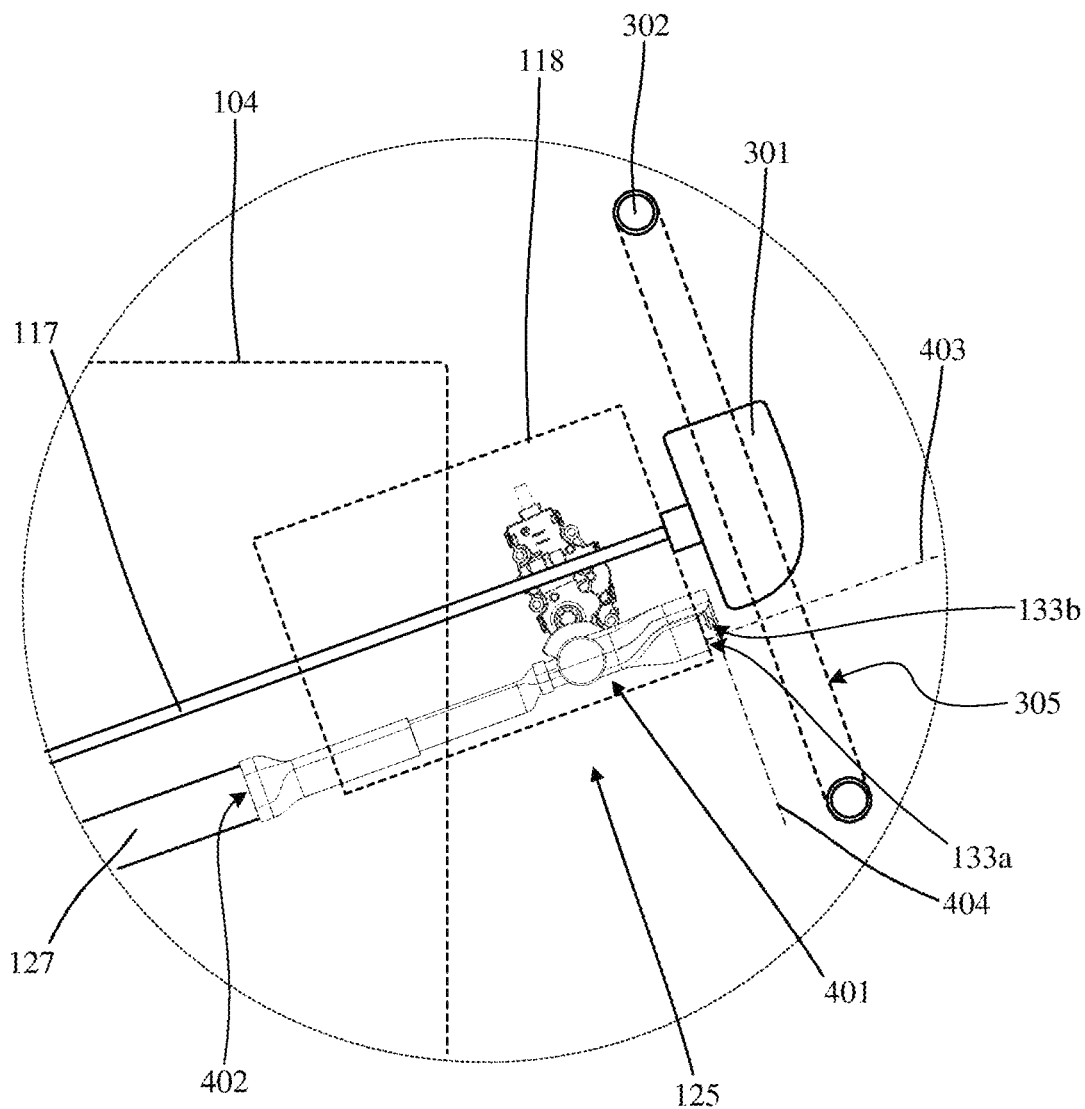
FIG. 4 is a schematic side view showing the vent assembly and a steering assembly of the passenger car.
Figure 5A:
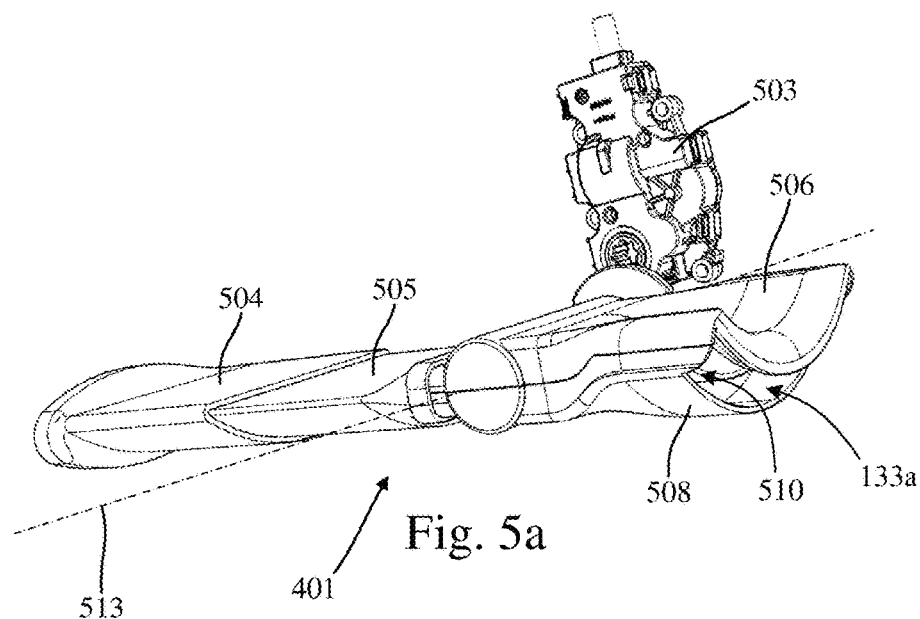
FIGS. 5a, 5b and 5c are front perspective, side elevation, and front elevation views of the vent assembly in isolation.
Figure 5B:
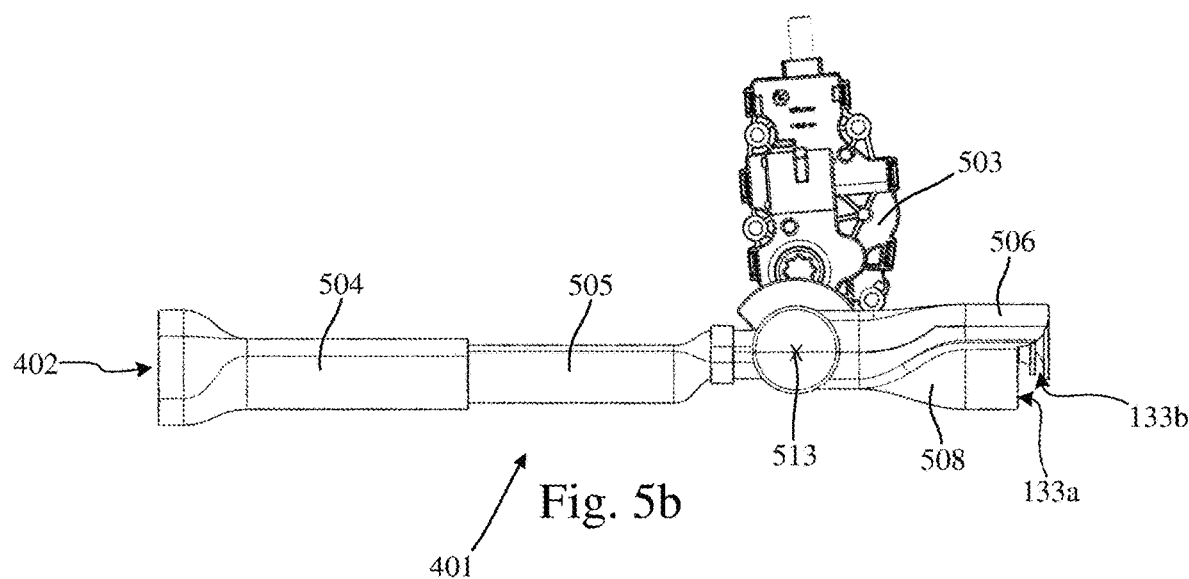
Figure 5C:
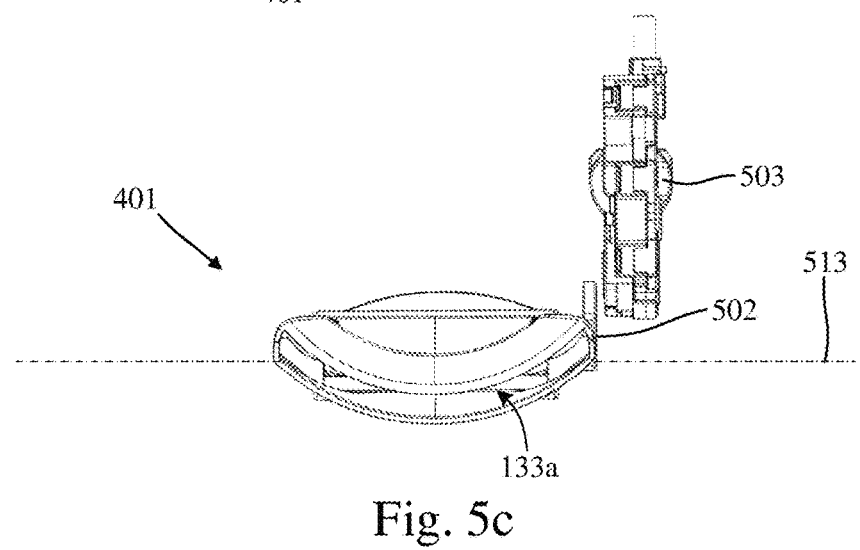
Figure 6A:
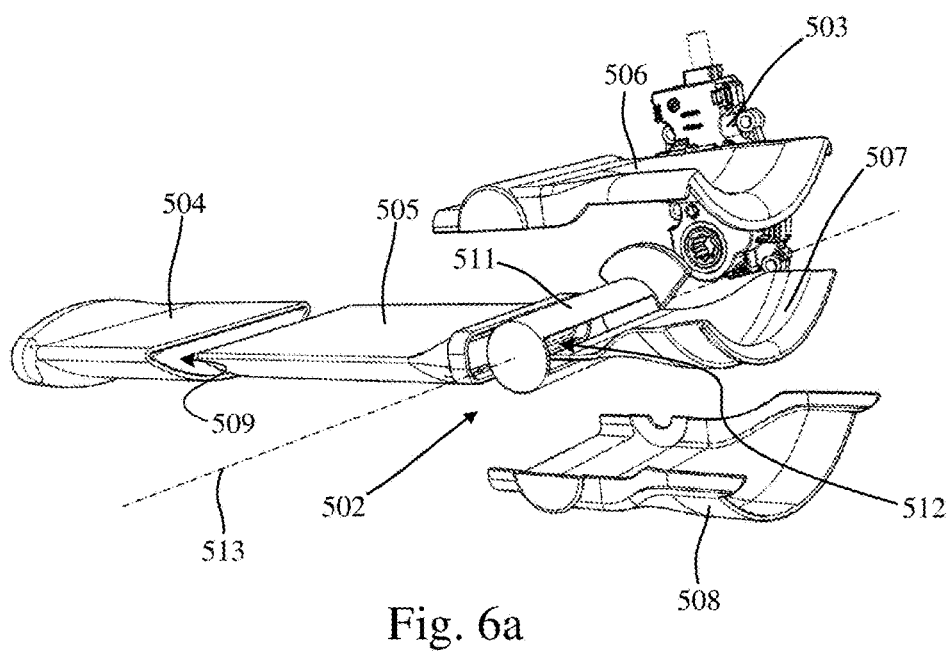
FIGS. 6a and 6b show the vent assembly in exploded perspective and exploded side elevation views respectively.
Figure 6B:
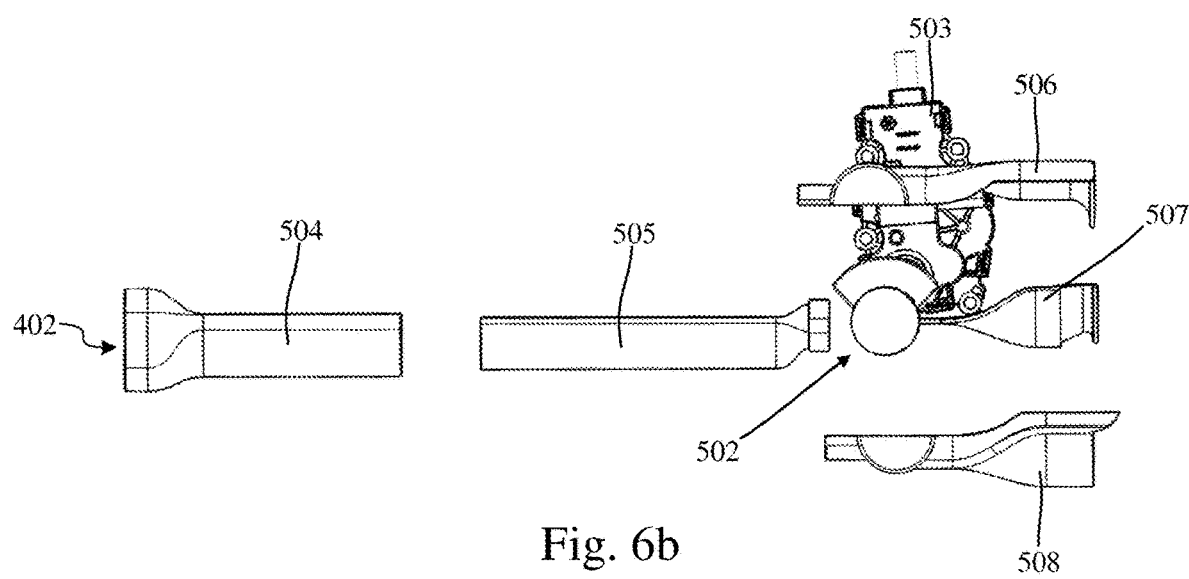

Referring next in particular to FIG. 4, the vent assembly 125 comprises a body 401 defining the inlet 402, a first outlet 133a, and a second outlet 133b. The vent assembly 125 is mounted to the steering column cowl 118 and extends within the cowl 118 generally parallel to the column shaft 117. The inlet 402 of the vent assembly 125 is coupled to the duct assembly 127 for receiving airflow from the air-handling unit 124 via the duct assembly 127. Airflow admitted through the inlet 402 of the vent assembly 125 is channeled through the body 401 to the first air outlet 133a and the second air outlet 133b.

The first air outlet 133a and the second air outlet 133b are open into the passenger cabin through a lower half of the rearward facing end of the steering column cowl 118. The first air outlet 133a is arranged to direct a first jet of air along a first jet axis 403 that projects from the outlet 133a rearwards into the passenger cabin through the gap 305 between an underside of the hub 301 and an upper side of the rim 302 of the steering wheel 119 alongside a lower end of the hub towards the driver seated in seat 107. The second air outlet 133b is arranged to direct a second jet of air along a second jet axis 404 that projects from the outlet 133b downwards through the passenger cabin 103, approximately orthogonally to the first jet axis 403, so as to intersect the first jet axis 133b at a position between the outlet 133a and the gap 305 of the steering wheel 119 to deflect the first jet of air downwardly away from the first jet axis 403.

As will be described with reference to FIGS. 5a, 5b, 5c, 6a and 6b, the vent assembly 125 is operable to vary the rate of flow of the second jet of air directed along the second jet axis 133b relative to the rate of flow of the first jet of air directed along the first jet axis 133a, so as to vary the degree of deflection of the first jet of air by the second jet of air.

Referring next collectively to FIGS. 5a, 5b 5c, 6a and 6b, the vent assembly 125 comprises body 401, a valve 502 located in the body 401 in the path of airflow between the inlet 402 and the outlets 133a, 133b, and a stepper motor 503 connected to the valve 502 and operable to cause the valve 502 to rotate within the body 401.

Body 401 comprises first and second duct sections 504, 505, and upper, lower and intermediate walls 506, 508, 507 respectively. In the example the duct sections 504, 505 and walls 506, 507, 508 of the body 401 are formed of a rigid plastic material.

Duct sections 504, 505 are each generally tubular and each define first and second open ends and a through passage 509 extending therebetween through which air can flow. The first open end of the first duct section 504 defines the inlet 402 to the vent assembly 125. The internal diameter of the first duct section 504 is marginally greater than the external diameter of the second duct section 505. The first open end of the second duct section 505 is received through the second open end of the first duct section 504, and the second duct section 505 is partially located within the first duct section 504. The second duct section 505 is telescopically movable within the first duct section 504 such that the overall length of the first and second duct sections can be increased or decreased to accommodate 'reach' adjustment movement of the steering column assembly 116.

Upper and lower walls 506, 508 join together to close a chamber 510 that is open at a first end to the second open end of the second duct section 505 and open at the second end to the passenger cabin to form the outlets 133a, 133b. The intermediate wall 507 is located in the chamber 510 between the upper wall 506 and the lower wall 508 at approximately half the height of the chamber in the path of airflow therethrough.

Valve 502 is located inside the chamber 510 defined between the upper and lower walls 506, 508 upstream of the intermediate wall 507. Valve 502 comprises a barrel valve body 511 which is generally cylindrical in form and which occludes substantially the full width and height of the chamber 510 such that substantially all the airflow flowing through the body 401 of the vent assembly 125 encounters the valve body 511. The valve body 511 defines a through bore 512 extending substantially the full width of the valve body 511 through which air may flow.

The valve body 511 is rotatable about an axis of rotation 513 extending in the width dimension of the chamber. Rotation of the valve body 511 thus changes the angle of the through bore 512 of the valve body 511 within the chamber 510. The stepper motor 503 is located outside of the chamber 510 and includes a rotatable shaft extending inside the chamber 510. The valve body 511 is mounted on the shaft of the stepper motor 503 and rotatable with the shaft such that the shaft defines the axis of rotation 513 of the valve body 511. The stepper motor 503 is thus operable by suitable electronic control means to rotate the valve body 511 within the chamber 510 about the axis of rotation 513.

Figure 7A:
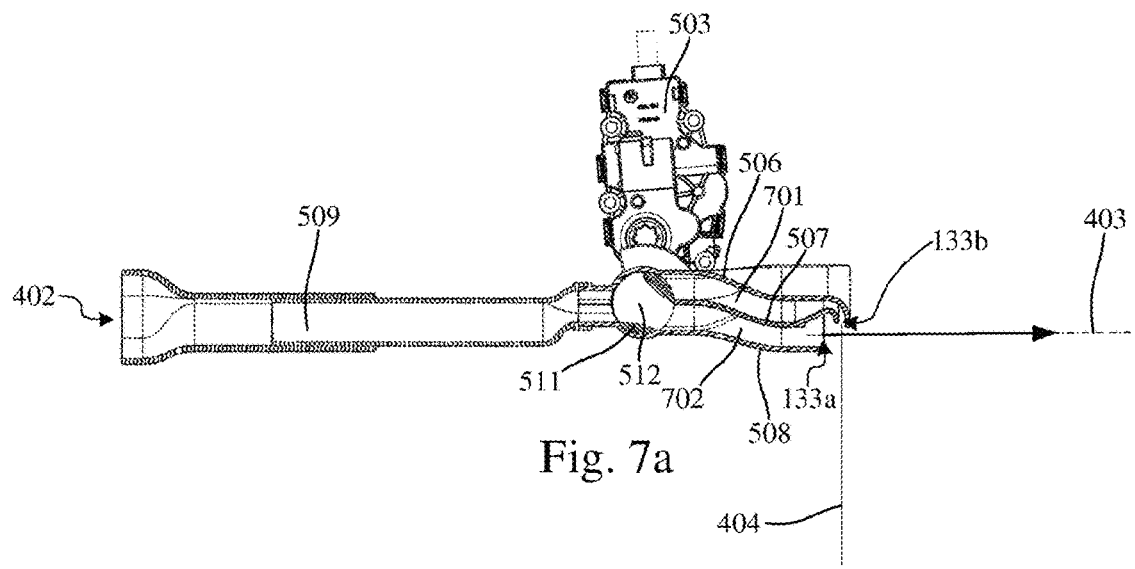
FIGS. 7a, 7b and 7c are schematic side-sectional views of the vent assembly showing paths of a first airflow and a second airflow discharged by the vent assembly into the passenger cabin.
Figure 7B:
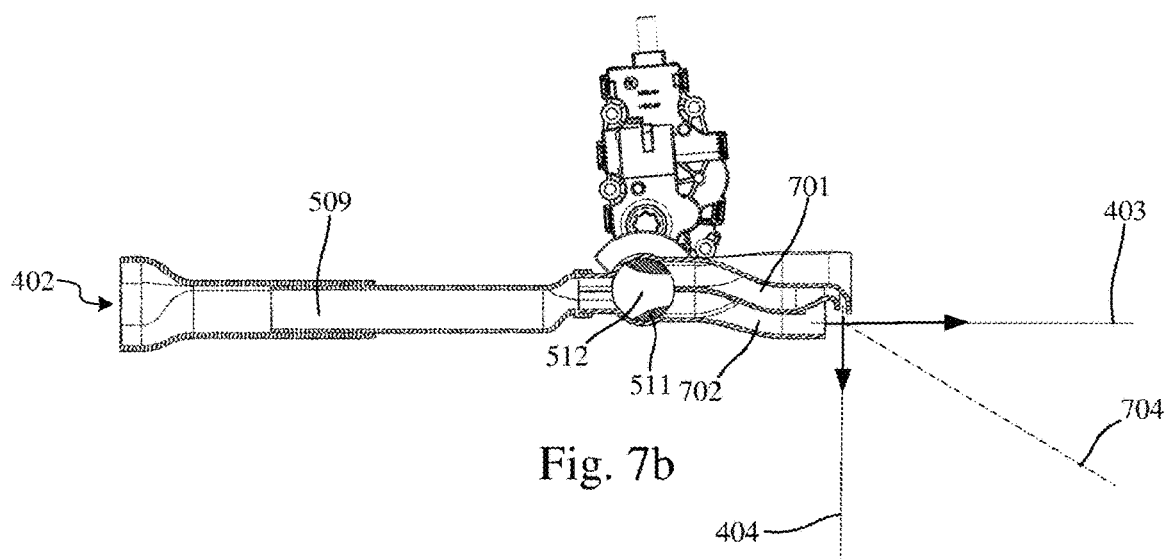
Figure 7C:
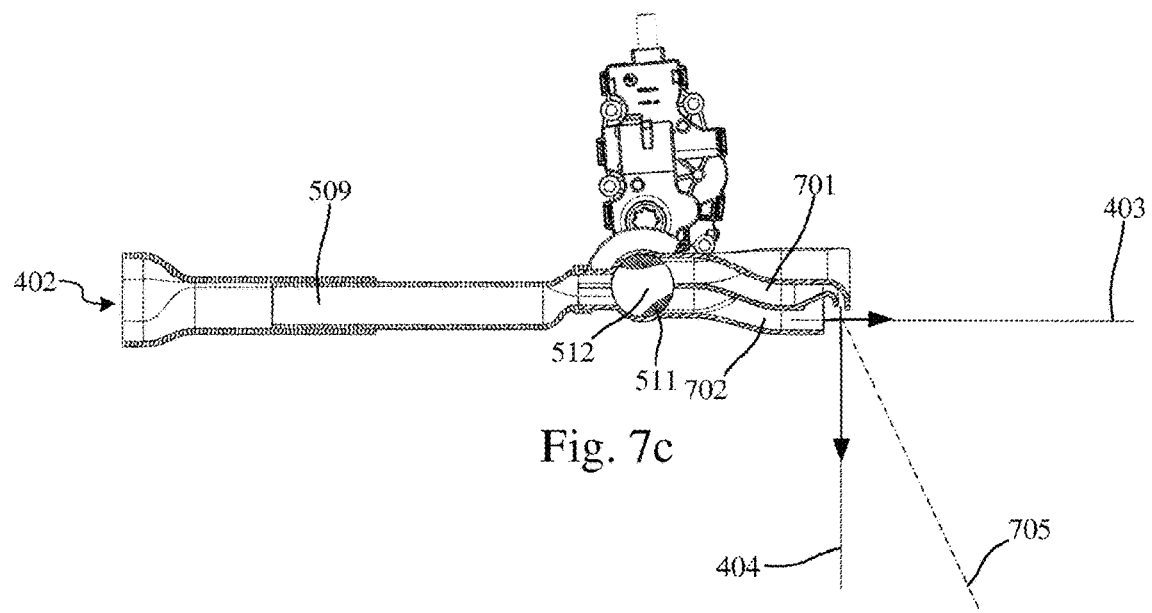

Referring next to FIGS. 7a to 7c, air flowing through the vent assembly flows sequentially from the inlet 402 through the passage 509 defined by the duct sections 504, 505, and across the valve 502 into the chamber 510 defined between the upper and lower walls 506, 508, to the outlets 133a, 133b.

The intermediate wall 507 extends from the valve 502 to the outlets 133a, 133b and divides the volume of the chamber 510 in two. An upper passage 701 is defined between an upper surface of the intermediate wall 507 and a lower surface of the upper wall 506. A lower passage 702 is defined between a lower surface of the intermediate wall 507 and an upper surface of the lower wall 508. The first air outlet 133a forms an outlet to the lower passage 702 such that all air flowing through the lower passage 702 is discharged through the outlet 133a. The second air outlet 133b forms an outlet to the upper passage 701 such that all air flowing through the upper passage 701 is discharged through the outlet 133b. The first air outlet 133a is larger in area than the second air outlet 133b. Consequently, the first air outlet 133a presents a lesser restriction to airflow along the lower passage 702 than the second air outlet 133b presents to airflow along the upper passage 701.

The valve 502 is functional to control the split of airflow between the upper passage 701 and the lower passage 702 and so vary the relative rates of flow of the first jet of air through the first air outlet 133a and the second jet of air through the second air outlet 133b.

Referring firstly to FIG. 7a, the valve 502 is shown in a first angular position in which the through bore 512 of the valve body 511 is angled downwardly such that the valve directs airflow substantially wholly to the lower passage 702 of the chamber 510. In contrast, the valve body 511 closes the upper passage 701 substantially completely. As a result, when the valve 511 is in the first position substantially all of the airflow through the vent assembly flows through the lower passage 702. Consequently, substantially all of the airflow is discharged through the outlet 133a as a jet of air directed along the first jet axis 403.

Referring secondly to FIG. 7b, the valve 502 is shown having been rotated about the axis of rotation 513 to a second angular position. In the second angular position the through bore 512 of the valve body 511 is angled generally horizontally such that the valve directs airflow into the chamber 510 both over the intermediate wall 507, i.e. into the upper passage 701, and under the intermediate wall 507, i.e. into the lower passage 702, in approximately equal proportions. The valve 502 and the intermediate wall 507 thus divide the influent airflow into two distinct airflows. Airflow along the lower passage 702 is discharged through the outlet 133a as a first jet of air directed along the first jet axis 403. Airflow along the upper passage 701 is turned to flow in a direction generally normal to the direction of the flow of the first airflow, and is discharged through the second outlet 133b as a second jet of air directed along the second jet axis 404.

Because the second jet axis 404 intersects the first jet axis 403, the second jet of air collides with the first jet of air at the point of intersection of the jet axes. At the point of collision the second jet of air deflects the first jet of air away from the jet axis 403 to a degree that is a function of the relative rates of the flow of the two jets of air, and the two jets of air coalesce to form a deflected jet of air directed along a trajectory 704 that extends intermediate the first jet axis 403 and the second jet axis 404 in a direction inclined downwardly from the first jet axis 403 by an angle of approximately 40°.

Referring thirdly to FIG. 7*c*, the valve 502 is shown having been further rotated about the axis of rotation 513 to a third angular position. In the third angular position the through bore 512 of the valve body 511 is angled upwardly. In the third position shown in FIG. 7*c* the valve 502 directs a major proportion of airflow flowing therethrough upwardly over the intermediate wall 507 into the upper passage 701, and only a minor proportion of the airflow below the intermediate wall 507 into the lower passage 702. Thus, a first jet of air is discharged through the outlet 133*a* along the first jet axis 403 with a rate of flow that is substantially less than a second jet of air discharged through the outlet 133*b* along the second jet axis 404. The second jet of air subsequently collides with the first jet of air and coalesces therewith to form a deflected jet of air that is directed along a trajectory 705, intermediate the first jet axis 403 and the second jet axis 404, that is inclined downwardly relative to the first jet axis 403 by an angle of approximately 70°.

Figure 8:
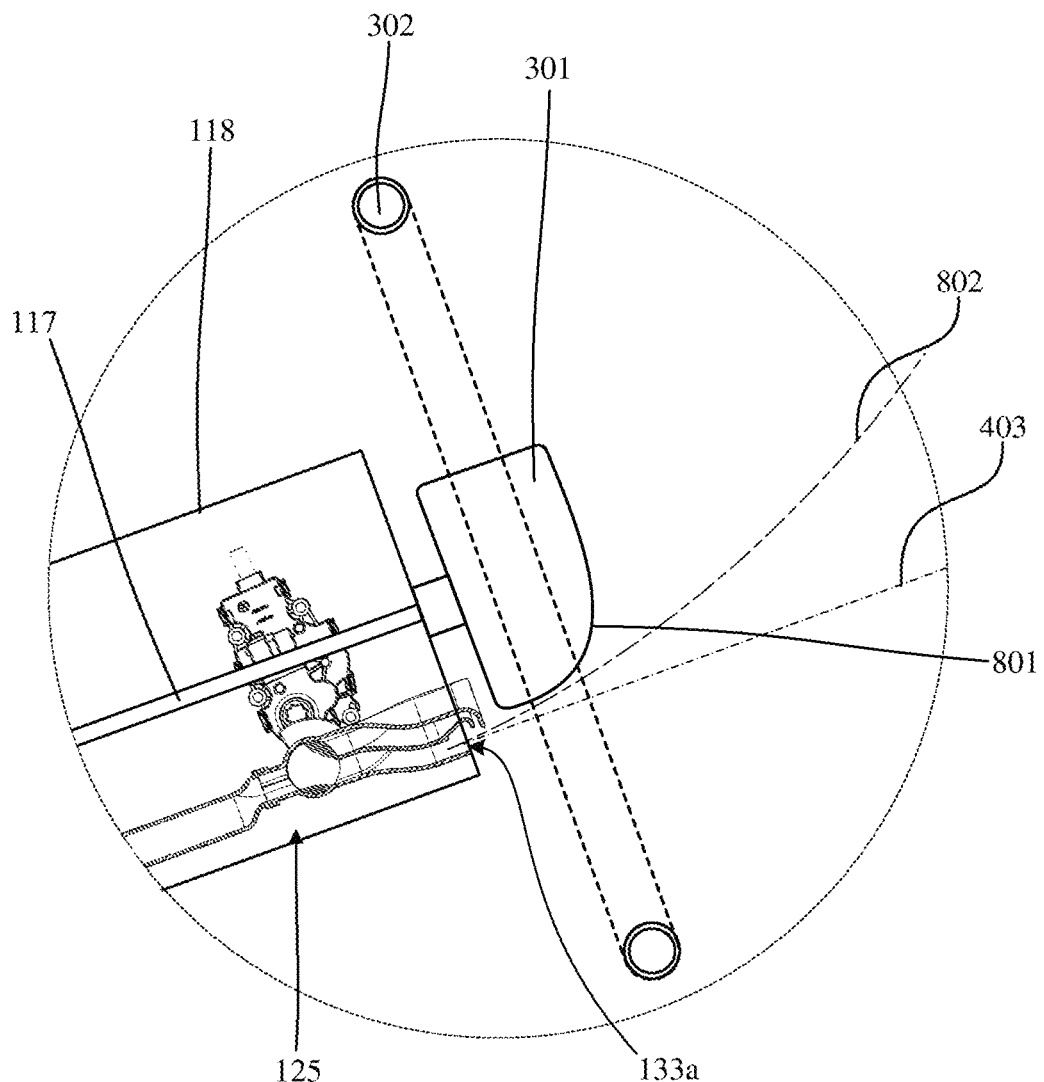
FIG. 8 is a schematic side-sectional view of the vent assembly and the steering assembly.

Referring next in particular to FIG. 8, in the example, the hub 301 of the steering wheel 119 has a surface 801 that curves gradually upwardly and rearwardly of the passenger cabin from a lower end to an upper end. The vent assembly 125 is arranged such that the first jet axis 403 projects rearwardly into the passenger cabin, through the gap between the hub 301 and the rim 302, alongside a lower end of the hub of the steering wheel, generally at a tangent to the curved surface 801 of the hub 301, such that air flowing along the first jet axis 403 encounters the curved surface 801 of the hub 301. The curvature of the surface of the hub causes the airflow of the first jet of air to at least partially attach to the curved surface 801 due to the Coanda effect, such that the jet of air is bent upwardly away from the first jet axis 403 generally to follow the Coanda axis 802. As a result of the attachment of the jet of air to the surface of the hub, the jet of air may be directed from the outlet 129 along an upward path that would otherwise be occluded by the hub 301 of the steering wheel 119. In the example, as will be described with reference to FIG. 9*a*, the attachment of the jet of air to the curved surface of the hub has the effect of directing the first jet of air upwards towards the face and neck regions of the seated driver.

Figure 9A:
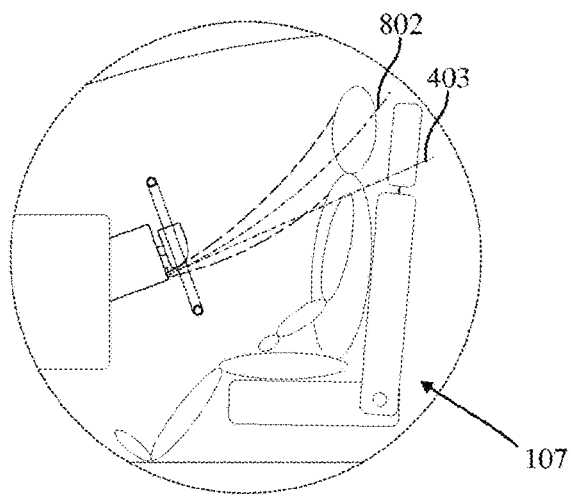
FIGS. 9a, 9b and 9c are schematic side views showing different paths of a jet of air discharged by the vent assembly into the passenger cabin of the car.
Figure 9B:
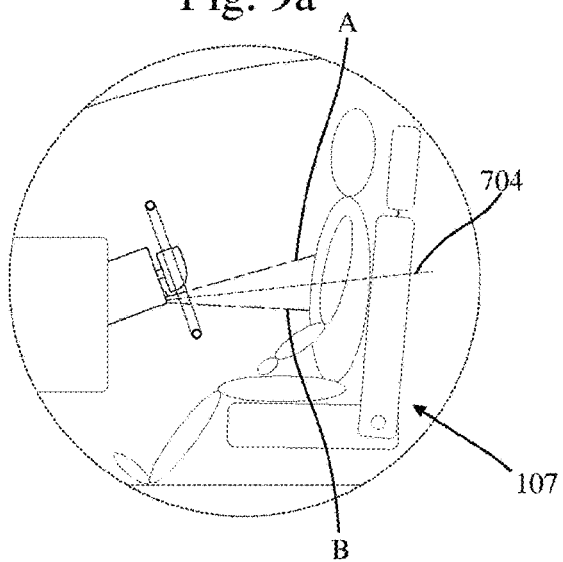
Figure 9C:
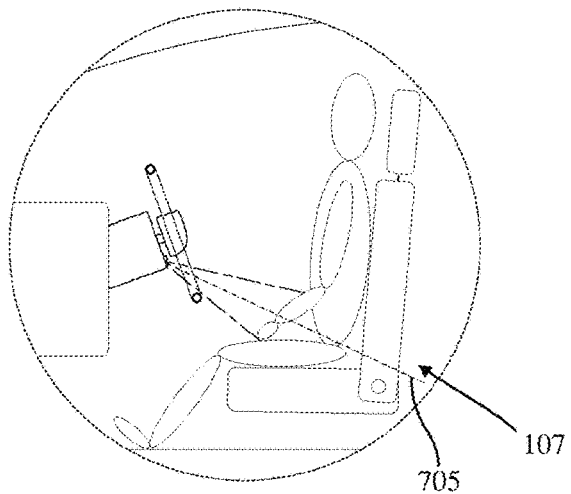

Turning next to FIGS. 9*a* to 9*c*, as previously described, the ventilation system is arranged to discharge airflow into the passenger cabin in a direction towards the driver seated in the seat 107.

Referring firstly to FIG. 9*a*, the ventilation system 112 is shown being operated with the vent assembly 125 in a first configuration which corresponds generally to the configuration depicted in FIG. 7*a*. In this configuration, as previously described, the vent assembly 125 directs a single jet of air through the outlet 133*a* along the first jet axis 403 through the gap 305 between the hub 301 and the rim 302 of the steering wheel 119.

The jet of air flowing along the first jet axis 403 encounters the curved surface 801 of the hub 301 of the steering wheel 119, partially attaches to the curved surface 801, and as a result the airflow is turned upwardly away from the first jet axis 403. Consequently, the jet of air is directed along the trajectory 802 upwards of the passenger cabin generally towards the face and neck area of the driver seated in seat 107.

Referring secondly to FIG. 9*b*, the ventilation system is shown being operated with the vent assembly in a second configuration which corresponds generally to the configuration depicted in FIG. 7*b*. In this configuration, as previously described, the vent assembly directs a first jet of air through the outlet 133*a* along the first jet axis 403, and a second jet of air through the outlet 133*b* along the second jet axis 404. The second jet of air collides with the first jet of air at a position between the outlet 133*a* and the gap 305 of the steering wheel 119 and deflects the first jet of air downwardly away from the first jet axis 403. As a result, the first jet of air does not encounter the curved surface 801 of the hub 301, and so is not bent upwardly. Rather, the two jets of air coalesce and form a single jet of air directed downwardly along the trajectory 704, through the gap between the hub 301 and the rim 302 of the steering wheel 119, generally towards the torso/abdomen region of the body of the seated driver.

Referring thirdly to FIG. 9*c*, the vent assembly is shown being operated with the vent assembly in a third configuration which corresponds generally to the configuration depicted in FIG. 7*c*. In this configuration, as previously described, the vent assembly 125 directs a first jet of air through the outlet 133*a* along the first jet axis 403 and a second jet of air through the outlet 133*b* along the second jet axis 404. Similarly to the mode of operation depicted in FIG. 9*b*, the second jet of air collides with the first jet of air at a position between the outlet 133*a* and the gap 305 of the steering wheel 119, and deflects the first jet of air downwardly away from the first jet axis 403. However, in this configuration, as described with reference to FIG. 7*c*, the second jet of air directed along the second jet axis 404 is relatively stronger than the first jet of air directed along the first jet axis 403. As a result, the first jet of air is deflected more steeply downwardly away from the first jet axis 403, such that when the constituent jets collide the deflected jet of air is directed along the trajectory 705, through the gap 305 between the hub 301 and the rim 302 of the steering wheel 119, towards the lap of the seated driver.

Figure 10A:
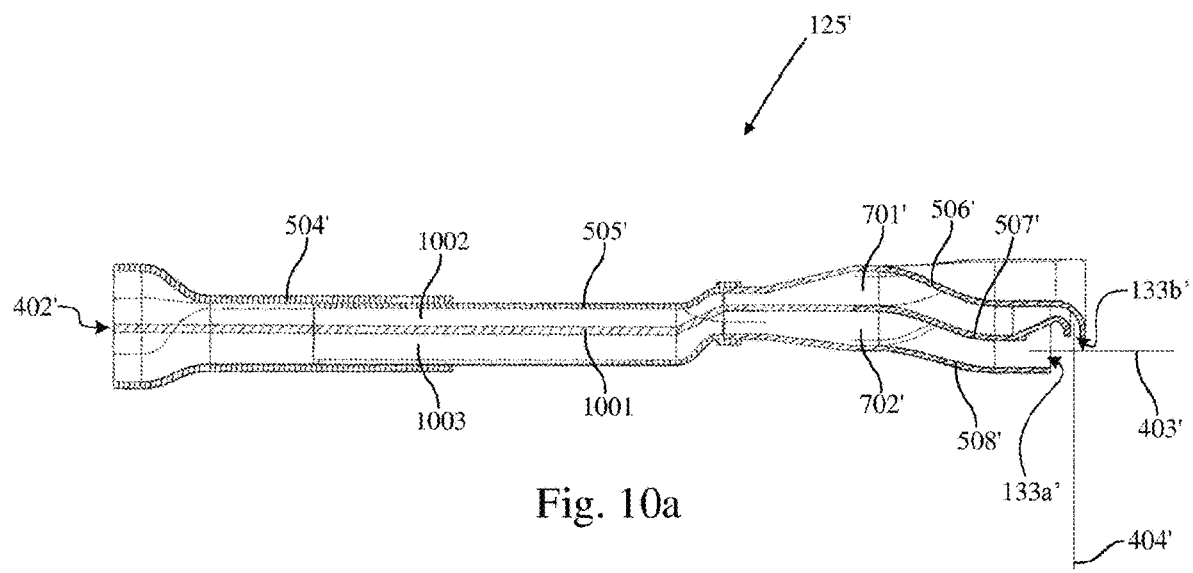
FIGS. 10a and 10b are first and second schematic side-sectional views of a second embodiment of a vent assembly embodying an aspect of the invention.
Figure 10B:
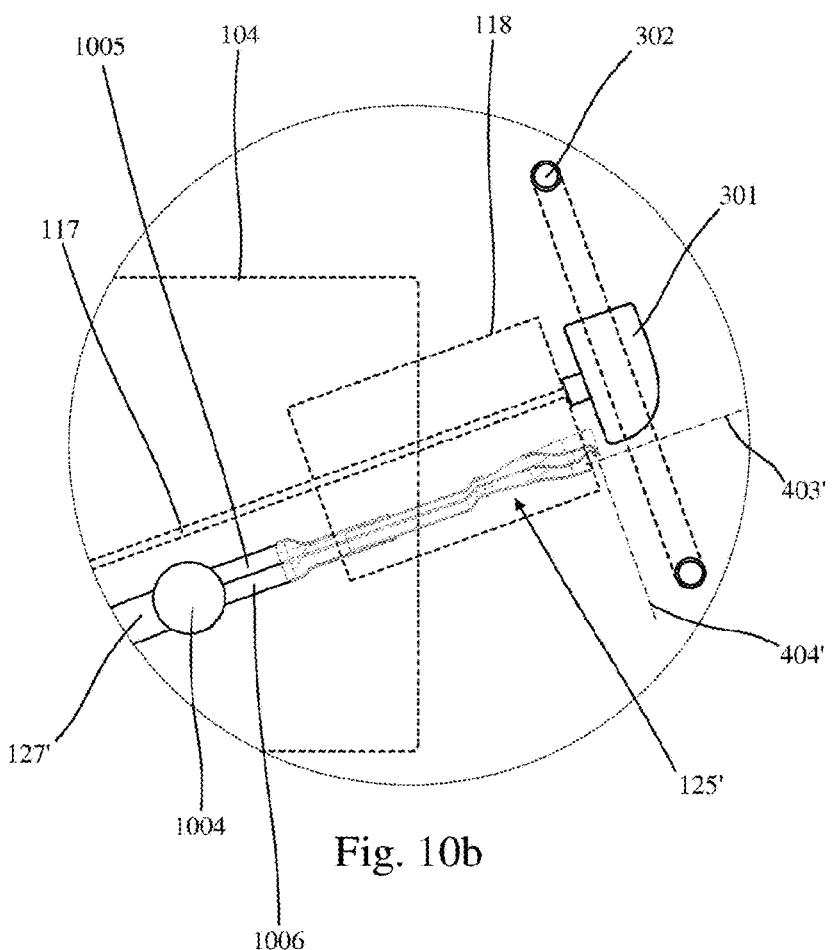

Referring finally to FIGS. 10 and 10*b*, an alternative embodiment of the ventilation system 112 previously described with reference to FIGS. 1 to 9 is shown.

Ventilation system 112' is substantially similar to the ventilation system 112 of FIGS. 1 to 9, and like reference numerals will be used to denote equivalent features. The only significant differences between the ventilation system 112' shown in FIGS. 10*a* and 10*b* from the foregoing ventilation system described with reference to FIGS. 1 to 9 are to the duct assembly 127' and the vent assembly 125'.

Turning firstly in particular to FIG. 10*a*, vent assembly 125' is substantially similar to vent assembly 125, in that it comprises duct sections 504', 505', and upper, lower and intermediate walls 506', 508', 507' respectively, and in that it is adapted to direct a first jet of air through the outlet 133*a*' along a first jet axis 403' and a second jet of air through the outlet 133*b*' along a second jet axis 404', where the second jet axis intersects the first jet axis. Vent assembly 125' differs from vent assembly 125 however inasmuch that vent assembly 125' does not comprise an internal valve for dividing airflow between the upper passage 701' and the lower passage 702'.

Instead, vent assembly 125' comprises a further wall 1001, which is located in the passage 509' defined by the duct sections 504' and 505', and which extends from the inlet 402' of the duct section 504' to an upstream end of the intermediate wall 507'. Vent assembly 125' thus comprises an upper passage 1002 extending through the duct sections 504', 505' and which meets the upper passage 701' of the chamber 510', and a lower passage 1003 extending through the duct sections 504', 505' and which meets the lower passage 702' of the chamber 510'. Thus, all airflow admitted through the inlet 402' of the vent assembly 125 into the lower passage 1003 of the duct sections 504', 505' is discharged through the outlet 133a of the lower passage 702' as a first jet of air directed along the first jet axis 403, and all airflow admitted through the inlet 402' into the upper passage 1002 of the duct assemblies 504', 505' is discharged through the outlet 133b as a second jet of air directed along the second jet axis 404.

Duct assembly 127' is further modified to include a valve 1004 that is substantially identical to the valve 502 of the vent assembly 125 of FIGS. 1 to 9, and to comprise upper and lower passages 1005, 1006 in the section of the duct assembly 127' leading from an outlet of the valve 1004 to the inlet 40021 of the vent assembly 125'. Thus, in this second embodiment, the valve 1004 is located in the duct 127' upstream of the vent assembly 125' at a position off the steering column assembly 116, and the valve 1004 functions to control the split of airflow between the upper and lower passages 1002 and 1003 of the duct sections 504', 505', and so the upper and lower passages 701', 702' of the chamber 510'. This configuration may be advantageous for the reason that the vent assembly 125' may be more dimensionally compact when the valve is omitted. It may thus be relatively easier to package the vent assembly 125' within the steering column cowl 118 than to package the vent assembly 125. Moreover, typically it may be easier to package the valve 1004 at a position off the steering column assembly 116 where available volume may not be so limited.

References in this specification to height and/or width dimensions of the jets of air are to diameters of the jets of air, in vertical and horizontal planes respectively, taken between diametrically opposed points of a cross-section through the jet of air depicting points where the (time-averaged) velocity of the jet has reduced to 10% of the local maximum velocity.

Thus, referring for example to FIG. 9b and the deflected jet of air directed along the axis 704, jet envelope line pair A and B map the locus of points where the velocity of the jet has reduced to approximately 10% of the local maximum velocity. The height of the jet according to this measure is thus represented by the distance between the lines A-B.

Defining the dimensions of the jets of air with reference to points where the velocity of the jet has reduced to 10% of the local maximum velocity is considered appropriate in the context of the invention because it may typically be expected that velocities less than 10% of the local maximum will unlikely be perceived by an occupant in the path of the airflow, or conversely would not be expected to cause discomfort to the occupant.

Various methods of evaluating the velocity field of a jet of air are known in the art, for example, using the background oriented schlieren (BOS) imaging technique. As is known, using the BOS technique, the density field of the jet of air may be computed based on the light deflection created during the passage of light through the understudy jet. The velocity field may subsequently be derived from the density field using known relationships and methodology. Alternative known velocity field measuring techniques include hot wire anemometry.

Further, the references in this specification to the "jet axis" is to an axis extending from the outlet of the vent assembly in the average direction in which the jet of air is discharged from the outlet. Whilst it is to be appreciated that, due for example to buoyancy of the jet and the force of gravity acting on the jet, the direction of the jet of air will typically deviate from the jet axis as it travels through the cabin environment, the jet axis may nevertheless typically be expected to represent a good approximation of the trajectory of the jet of air through the cabin.

The jet axis of a jet of air may be derived by inspection of the velocity field of the jet. The jet axis may conveniently be derived with reference to the jet centreline of the jet, the jet centreline representing the locus of points at which the (time-averaged) velocity if the jet is a local maximum, i.e. plotting the actual average direction of the jet of air as it travels an infinitesimally short distance from the outlet through the cabin environment. The jet axis may thus be taken as the tangent of the jet centreline at the outlet of the vent assembly. The jet centreline and thus the jet axis may be determined using the aforementioned BOS or hot wire anemometry techniques.

References in this specification to "left-hand" or "left" and "right-hand" or "right" are directional definitions from the perspective of an observer facing forwardly of the vehicle, as is the conventional nomenclature in the field of the invention. Similarly references to "forwardly" or "forward" and "rearwardly" or "rearward" are, as is conventional, definitions relative to the front and rear of the vehicle respectively.

The invention claimed is:

1. A vehicle comprising:
a passenger cabin;
a steering assembly comprising a steering wheel mounted on a steering column assembly; and
a ventilation system having a first air outlet for discharging a first jet of air, and a second air outlet for discharging a second jet of air,
wherein the first air outlet and the second air outlet are located on the steering column assembly and the second jet of air intersects and deflects the first jet of air, and
wherein the second air outlet is located above the first air outlet, and the second jet of air projects downwardly to intersect the first jet of air.

2. The vehicle as claimed in claim 1, wherein the first air outlet and the second air outlet are located on a lower half of the steering column assembly.

3. The vehicle as claimed in claim 1, wherein the steering wheel comprises a hub and a rim and the first jet of air projects below the hub.

4. The vehicle as claimed in claim 1, wherein the ventilation system comprises a valve for regulating the rate of flow of the second jet of air relative to the first jet of air to vary the amount by which the first jet of air is deflected.

5. The vehicle as claimed in claim 1, further comprising a valve located on the steering column.

6. The vehicle as claimed in claim 5, wherein the ventilation system comprises a blower, an upstream duct extending from the blower to the valve, a first downstream duct extending from the valve to the first air outlet, and a second downstream duct extending from the valve to the second air outlet.

7. The vehicle as claimed in claim 1, wherein the first jet of air is discharged from the first outlet along a first jet axis, the second jet of air is discharged from the second outlet along a second jet axis, and the second jet axis is inclined at an angle of between 80 and 100 degrees relative to the first jet axis.

8. The vehicle as claimed in claim 1, wherein the steering wheel comprises a hub and a rim, and the first jet of air projects through a gap between the hub and the rim.

9. The vehicle as claimed in claim 8, wherein the second jet of air intersects the first jet of air at a position upstream of the gap.

10. The vehicle as claimed in claim 8, wherein the first jet of air has a width or height at the gap that is no greater than 120% of a corresponding dimension of the gap.

11. The vehicle as claimed in claim 8, wherein the first jet of air attaches to and follows a curved surface of the hub to deflect the first jet of air.

12. The vehicle as claimed in claim 8, wherein the second jet of air deflects the first jet of air in a first direction, and a curved surface of the hub deflects the first jet of air in a second, different direction.

13. The vehicle as claimed in claim 8, wherein the first jet of air projects below the hub and a curved surface of the hub curves upwardly.

\* \* \* \* \*